United States Patent [19]
Bailey

[11] Patent Number: 5,813,128
[45] Date of Patent: Sep. 29, 1998

[54] BALL BAR APPARATUS FOR CALIBRATING A MACHINE

[75] Inventor: Andrew M. Bailey, Schaumburg, Ill.

[73] Assignee: Renishaw PLC, Wotton-Under-Edge, United Kingdom

[21] Appl. No.: 785,607

[22] Filed: Jan. 17, 1997

[30] Foreign Application Priority Data

Jan. 27, 1996 [GB] United Kingdom .................... 9601679

[51] Int. Cl.⁶ ................................................. G01C 25/00
[52] U.S. Cl. ............................................... 33/502; 73/1.79
[58] Field of Search .............................. 33/502, 503, 567, 33/567.1; 73/1.79, 1.01

[56] References Cited

U.S. PATENT DOCUMENTS

| | | | |
|---|---|---|---|
| 4,435,905 | 3/1984 | Bryan . | |
| 4,777,818 | 10/1988 | McMurtry | 73/1.79 |
| 4,884,348 | 12/1989 | Zeller et al. | 33/502 |
| 4,962,591 | 10/1990 | Zeller et al. | 33/502 |
| 4,982,504 | 1/1991 | Soderberg et al. | 33/502 |
| 5,214,857 | 6/1993 | McMurtry et al. | 33/502 |
| 5,647,136 | 7/1997 | Jostlein | 33/502 |

*Primary Examiner*—Christopher W. Fulton
*Attorney, Agent, or Firm*—Oliff & Berridge, PLC

[57] ABSTRACT

Apparatus is provided for mounting a ball bar on a machine such that the ball bar can be rotated through 360° in three orthogonal planes which intersect the center of a single ball (22) to calibrate relative movement between the spindle and a table of machine in all three planes. The apparatus consists of amounting device in the form of a block (10) on the machine table from which extends a rod (18) terminating in a socket (20) for supporting the ball (22). The rod extends from the block at a compound angle of 45° to each of the three planes. The ball supports a socket on one end of a ball bar (34). A second mounting device is provided on the machine spindle in the form of a tool arm (26) from which extends a rod (28) terminating in a socket (30) for supporting a ball on the other end of the ball bar (34). The rod (28) extends at a compound angle of 45° to all three planes. The ball bar is thus able to lie in any one of the three orthogonal planes and to be rotated through 360° in each without fouling the mounting devices. The dimensions of the mounting devices are also arranged to be such that the ball bar does not foul the spindle or the table of the machine when being rotated in the vertical planes.

10 Claims, 4 Drawing Sheets

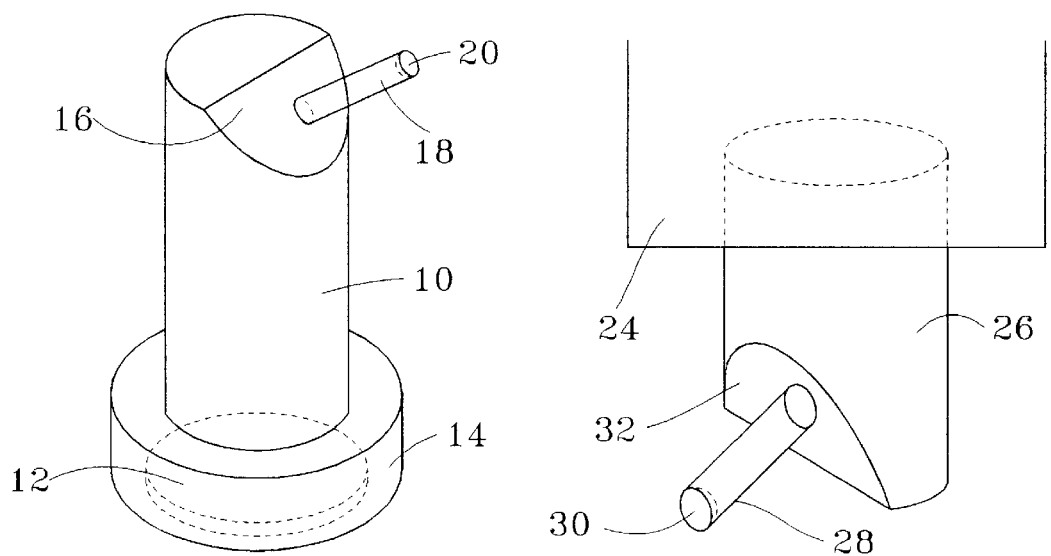
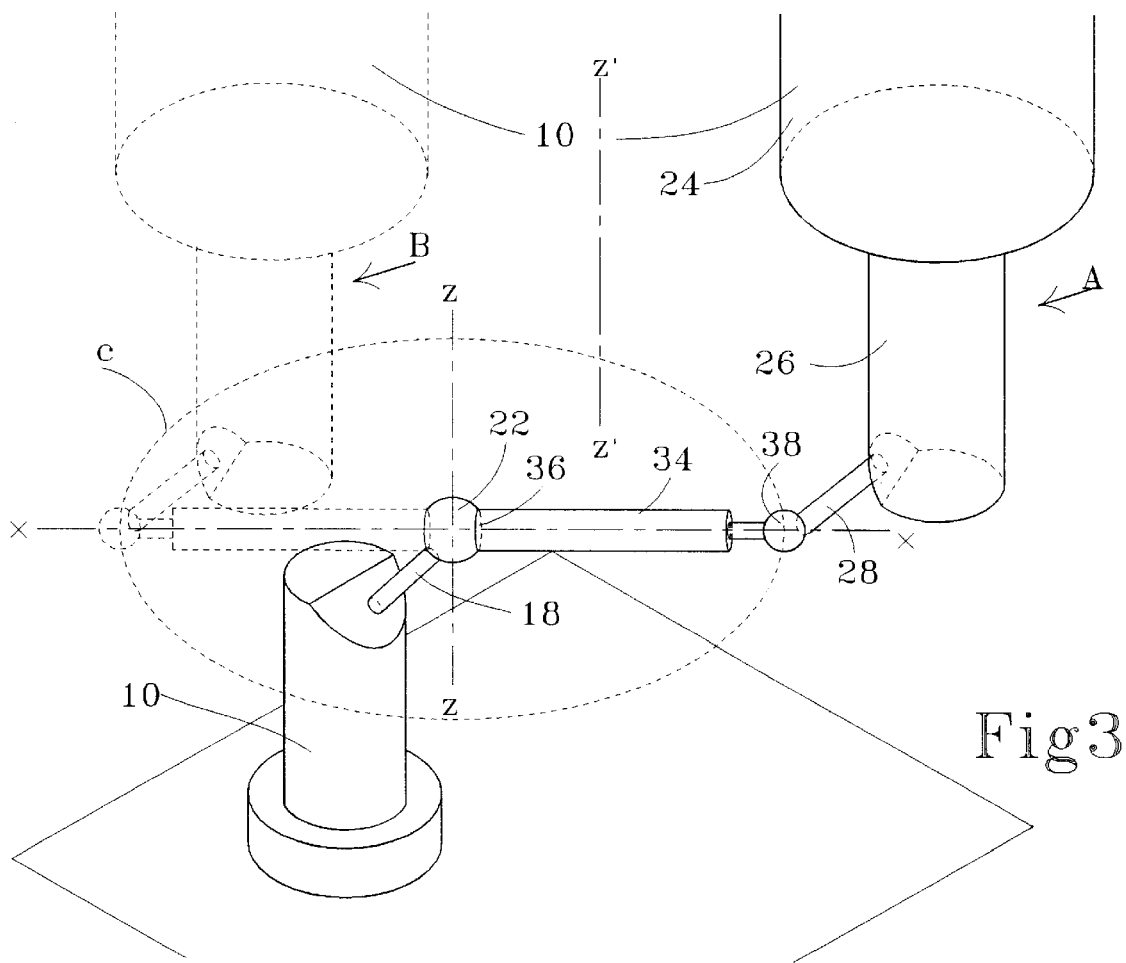
Fig 1   Fig 2
Fig 3

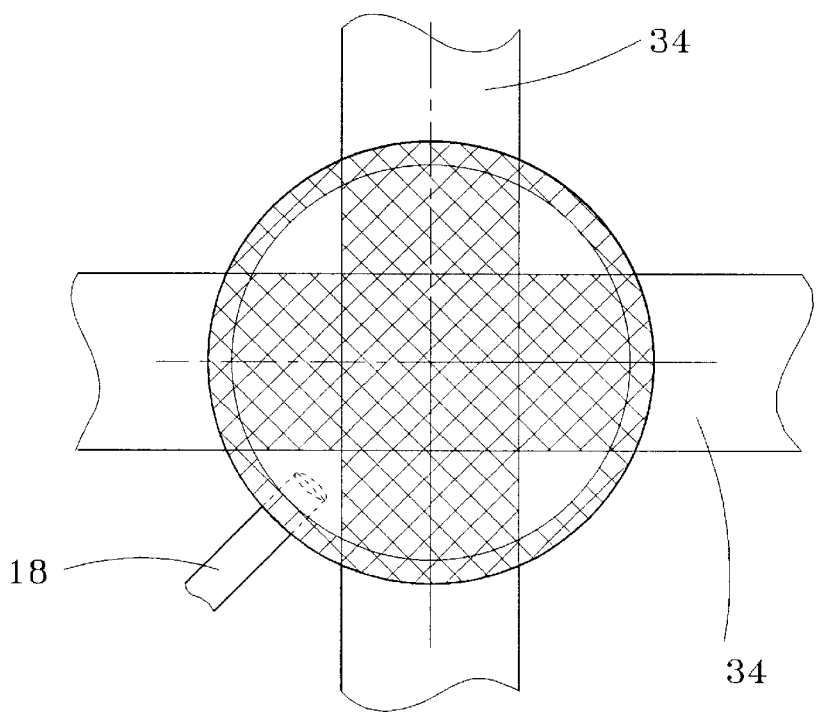
Fig 6
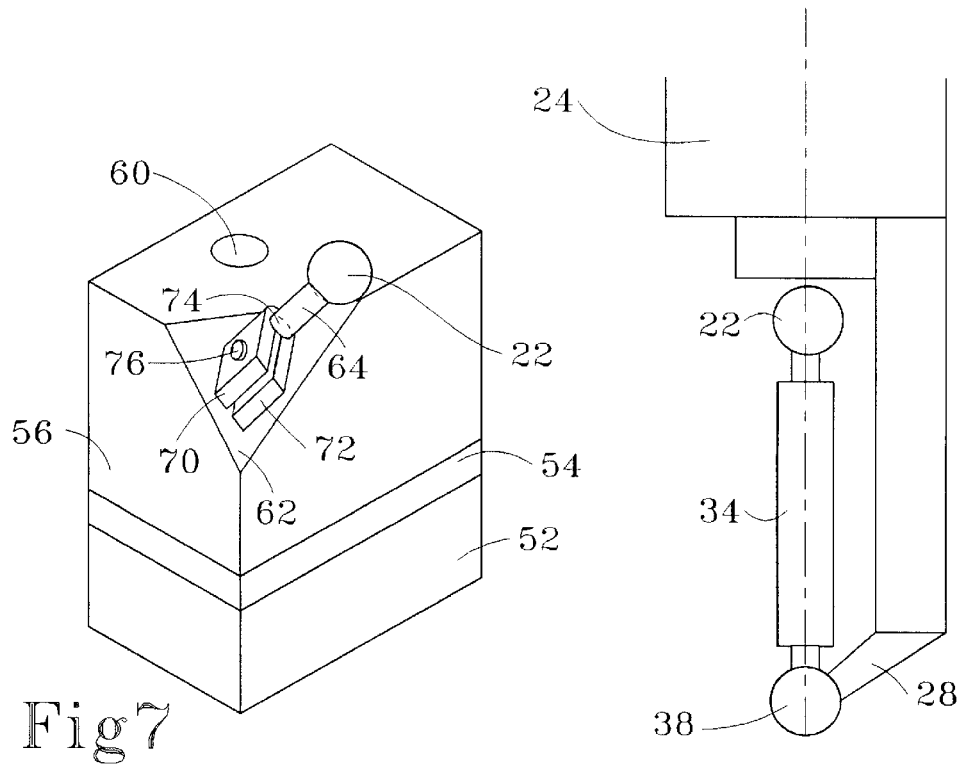
Fig 7
Fig 8

BALL BAR APPARATUS FOR CALIBRATING A MACHINE

The present invention relates to ball bars and their use in calibrating machines.

A ball bar is well-known from U.S. Pat. No. 4,435,905 to Bryan. It consists of a telescopic rod having a ball at each end, and which can be positioned between a socket carried by the spindle of a machine, and a socket mounted on the machine table. The spindle is driven around in a circle about the center of the table-mounted socket, for example in a horizontal, x,y plane, and measurements are made of any change in length of the ball bar by means of a transducer in, or on, the telescopic rod.

The most accurate calibration of the errors in the spindle movement around the circle are obtained when the axis of the ball bar lies in a plane which includes the centre of the ball in the socket, because then errors in the movement of the spindle along its axis do not affect the length of the ball bar. Thus the results of the test reflect only errors of movement of the spindle in the x,y plane.

It is possible to make some measurement of errors in the spindle movement in the vertical x,z or y,z planes through the centre of the ball in the table-mounted socket, but with the apparatus set up as described above, the spindle cannot move through more than 180° in these planes without coming into contact with the ball bar or the socket support.

A circle through 360° can be made by the spindle in a vertical plane alongside the table-mounted socket, and sufficiently offset from the socket that such contact of the spindle with the socket or the ball bar is avoided. However, with this set up the ball bar will lie at an angle to the vertical plane, and its length can be varied by movements of the spindle in the horizontal plane which can give rise to errors in the calibration of the vertical plane.

Alternatively the socket could be re-positioned so that it is possible to enable the spindle to perform a 360° circle centred on the ball in the socket and with the ball bar lying in a vertical plane through the centre of the ball in the socket.

This has the disadvantages, particularly when doing all three planes, that three separate operations may be needed which is time-consuming in itself, and that three different positions may be required for the socket, so that the calibrations are not performed about the same centre and are not easily correlated.

One object of the present invention is to provide apparatus for calibrating all three planes of a machine and which allows a ball bar in a machine spindle to be driven around 360° separately in each of three orthogonal planes of the machine with the ball bar centred on a single fixed position, and with the axis of the ball bar lying in the respective calibration plane each time.

According to one aspect of the present invention there is provided a mounting device for supporting a telescoping calibration device for rotational movement about the centre of a ball during calibration of relative movements of parts of a machine, said device including support means for supporting the ball on one of the machine parts and wherein the centre of the ball defines the intersection of three orthogonal planes and the mounting device lies wholly in a volume not intersected by the planes.

The ball about which the calibration device rotates may be permanently attached to the support means, may be releasably attached to the support means, or may form part of the calibration device itself.

The centre of the ball preferably lies on a line extending from the mounting device at an angle of 45° to all three of said planes.

In a preferred embodiment the support means comprises a rod, the axis of which extends along a line through the centre of the ball and at 45° to all three of said planes, and on the end of which is either the ball about which the calibration device rotates, or a socket for support the ball.

It is to be understood that in all embodiments of the invention, the centre of the ball lies sufficiently far from any surface of the mounting device, that during a calibration process, the calibration device can be rotated through 360° about the centre of the ball while lying in any of the three orthogonal planes without coming into contact with the mounting device, or any part of the machine.

Also according to the present invention there is provided apparatus for calibrating a machine having a table, a spindle, and means for producing relative circular movements therebetween in three orthogonal planes, the apparatus comprising:

a first mounting device on the machine table, a second mounting device on the machine spindle, a telescopic ball bar extending between the two mounting devices, a first ball and socket joint consisting of a ball on one of the ball bar and the first mounting which engages a socket on the other one of the ball bar and the first mounting, a second ball and socket joint consisting of a ball on one of the ball bar and the second mounting which engages a socket on the other one of the ball bar and the second mounting, characterised in that during said relative movement between the table and the spindle in each of said three orthogonal planes, the ball bar lies in a calibration plane which is parallel to the plane in which the movement is taking place and which includes the centre of the first ball and socket joint, and sweeps through a volume in space, the first mounting device is positioned such that it lies wholly outside said volumes swept by the ball bar in all three orthogonal planes, and the dimensions of the first and second mounting devices are such that the ball bar can be rotated through 360° in all three calibration planes without interference between any of the ball bar, the first and second mounting devices, the spindle and the machine table.

In one embodiment of the invention, the dimensions of the mounting devices are such that the distances between the centre of the first ball and socket joint and the table, and between the second ball and socket joint and the spindle, are each greater than the distance between the centres of the two ball and socket joints by at least the radius of the first ball and socket joint.

In another embodiment of the invention, the dimensions of each of the mounting devices are such that the distance of the centre of the first ball and socket joint from the table is greater than the distance between the centres of the two ball and socket joints by at least the radius of the second ball and socket joint, and the swept volumes of the ball bar in the three calibration planes do not include any part of the two mounting devices or of the spindle.

Examples of the invention will now be described, with reference to the accompanying drawings in which:

FIG. 1 illustrates a preferred form of mounting device in accordance with the present invention for mounting a calibration ball on a machine table;

FIG. 2 illustrates a preferred form of mounting device in accordance with the present invention for a socket on a machine spindle;

FIG. 3 illustrates the complete calibration apparatus of FIGS. 1 and 2 in position on a machine showing the movement of the machine spindle during calibration of the x-y plane of the machine;

FIG. 6 is an enlarged view of the calibration ball and the areas of its surface swept by the socket on the ball bar;

FIG. 7 shows an alternative form of mounting device for the calibration ball in accordance with the invention; and FIG. 8 shows another alternative form of mounting device for the spindle of the machine.

Figure 4:
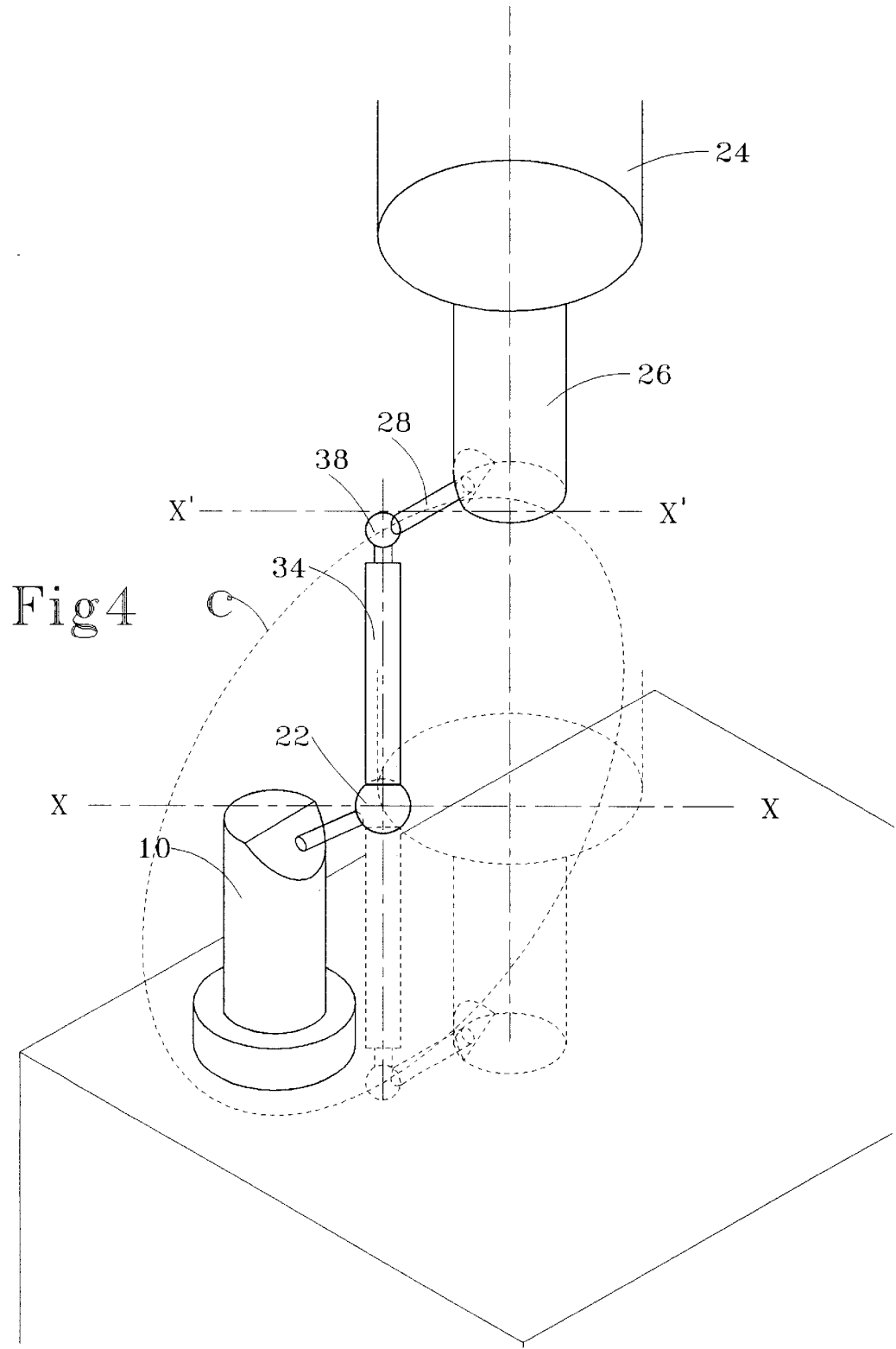
FIG. 4 illustrates the complete calibration apparatus showing the movement of the machine spindle during calibration of the y-z plane of the machine in accordance with one embodiment of the invention.

Referring now to the drawings there is shown in FIG. 1 a cylindrical block 10 which is releasably connectable to a machine table by any convenient means, for example by having a permanent magnet 12 in its base 14.

The top of the support block is cut away at an angle (preferably 45°) to all three orthogonal planes, two vertical and one horizontal containing the x,y, and z axes of the block to produce a flat face 16. Attached perpendicularly to the flat face 16 is a rod 18 which terminates in a socket 20. The block 10 together with rod 18 and its socket 20 constitute a first mounting device of the apparatus, the rod and socket comprising the support means for supporting a ball 22 about which a telescoping ball bar 34 rotates.

FIG. 2 shows a second mounting device of the apparatus. The mounting device consists of tool arm 26 fitted to the spindle 24 of the machine by means of a suitable conventional shank (not shown). Connected to the tool arm 26 is a support rod 28 which has a magnetic socket 30 at its free end. The rod and socket comprise support means for supporting a ball 38 of a ball bar 34.

The support rod 28 is connected to, and extends perpendicularly from a flat face 32 formed on the free end of the tool arm at an angle (preferably 45°) to all three orthogonal planes, two vertical and one horizontal containing the x,y and z axes of the arm 26.

Figure 5:
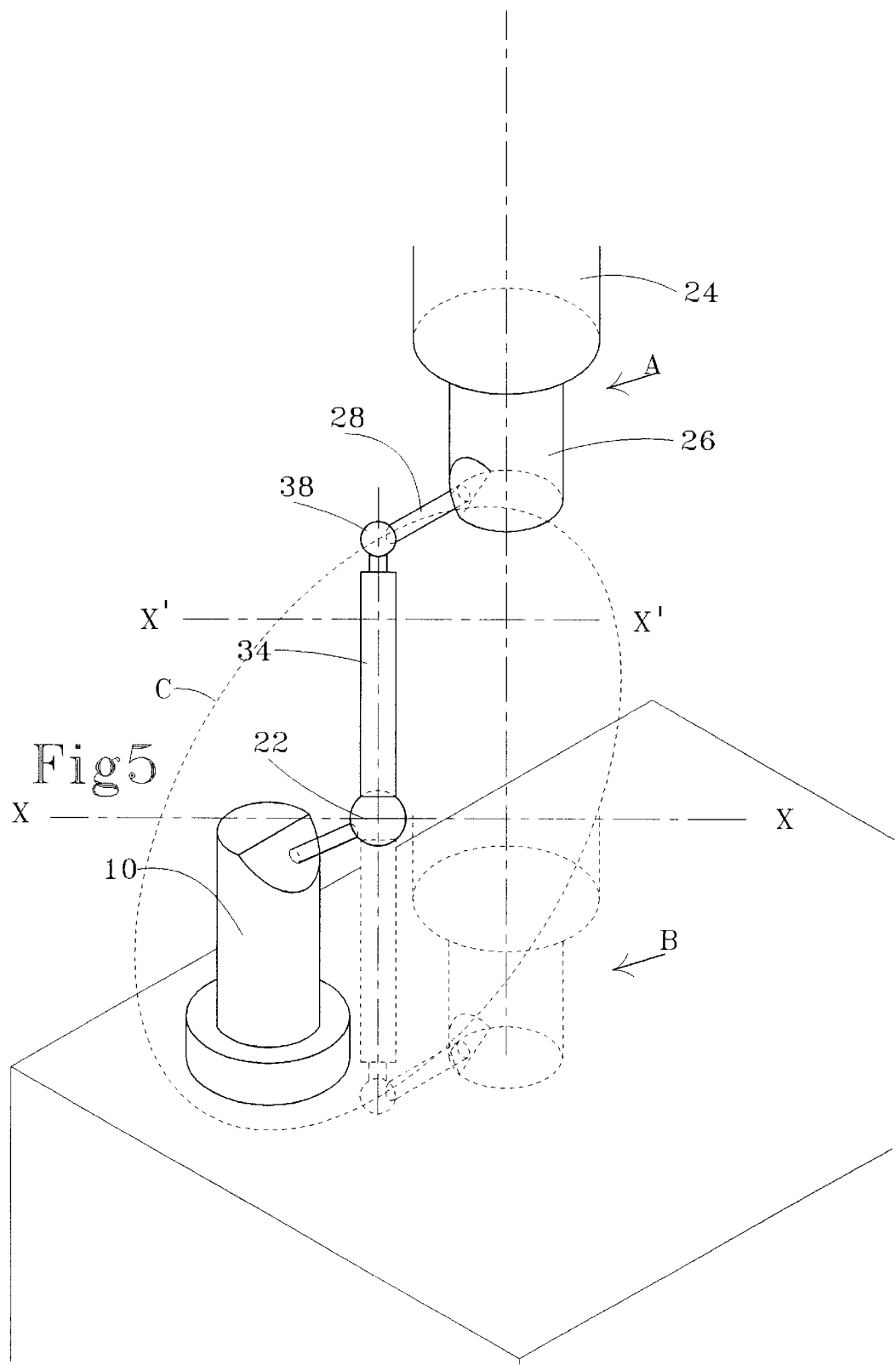
FIG. 5 illustrates the complete calibration apparatus showing movement of the machine spindle during calibration of the y-z of the machine in accordance with an alternative embodiment of the invention.

Referring now to FIGS. 3 to 5, there is shown a machine with a ball bar in position for calibrating the machine. In this example the first mounting is used to support a calibration ball 22 which is permanently fixed to the end of rod 18. Alternatively the ball 22 maybe clamped to the socket 20 by a magnetic clamp.

The ball bar, shown by reference numeral 34, may be of any conventional type. In this example it has a socket 36 at one end for magnetic attachment to the ball 22, defining a first ball and socket joint, and a ball 38 at the other end for attachment to the socket 30 on the support rod 28 defining a second ball and socket joint. Preferably, the ball bar is of the telescoping type and includes a transducer (not shown) for determining relative movements along the ball bar axis, of the ball 38 and socket 36 at its ends. The ball bar is thus capable of measuring relative movements between the centres of the balls 22 and 38 along a radius of a circle described by the spindle movement, and caused by inaccuracies in the spindle movement. It is to be understood that in an alternative embodiment of the invention, the ball 22 could be replaced by a socket, and the socket 30 could be replaced by a ball. In this embodiment the ball bar would have a ball in place of socket 36 and a socket in place of ball 38.

It can be seen that in accordance with the invention, the two mounting devices are dimensioned and oriented such that when the balls 22 and 38 respectively are in position in the sockets 20 and 30, three orthogonal planes e.g. xy,yz and xz planes can be drawn through each ball, all intersecting at the centres of the balls, and in each case the respective mounting device lies wholly in a volume not intersected by these planes.

FIG. 3 shows calibration of the movements of the spindle in a circle in the x-y plane, i.e. movement of the spindle about an axis z'-z' parallel to the z-z axis through the centre of the first ball and socket joint. This figure shows two extreme positions the spindle as it rotates the ball bar in a circle C around the centre of the first ball and socket joint. The position A of the spindle shown in full lines is, for example, the starting position, and the position B shown in dotted lines, is the position after 180° of movement of the spindle about the axis z'-z'. It can be seen that due to the angled dispositions and the lengths of the rods 20 and 28, the ball bar and spindle can rotate through 360° without fouling mounting block 10 or the support rod 20.

FIG. 4 shows calibration of the movements of the spindle in the y-z plane, i.e. movement of the spindle about an x'-x' axis to cause rotation of the ball bar in a circle C about an x-x axis through the centre of ball 22. Using the teaching of the present invention calibration of spindle rotation can be undertaken through 360° without the spindle fouling the ball bar, or any part of the machine table including the mounting block and rod 22.

One way in which this is achieved is by ensuring that in addition to ensuring that the angles of faces 16 and 32 and the lengths of rods 18 and 28 are correct, the z-axis dimensions of the first and second mountings are such that the distances between centre of the first ball and socket joint and the machine table, and between the second ball and socket joint and the base of the spindle are each greater than the length of the ball bar by at least the radius of the first ball and socket joint. By this means, as the spindle reaches the dotted line position shown in FIG. 4, the ball of the second ball and socket joint will be clear of the machine table, while the base of the spindle passes over the top of the ball 22.

Alternatively, it can be arranged as shown in FIG. 5 that the x and y coordinates of the centres of the two ball and socket joints lie sufficiently outside the projected areas (in the z-axis direction) of the first mounting and the spindle respectively, that the spindle will pass alongside the first mounting during its movement about the x'-x' axis. That is, the swept volume of the ball bar will not include any part of the two mountings or of the spindle. Again the distance of the centre of the ball 22 above the machine table must be greater than the length of the ball bar by a sufficient distance to ensure that the ball bar does not come into contact with the table during its rotation.

The disposition of the support rods 18 and 28 at 45° to all three x,y and z axes of the support block 10 and tool arm 26 respectively allow calibration of the movement of the spindle in the x-z plane, i.e. a circular movement of the spindle such as to rotate the ball bar in a circle C about a y-y axis through the centre of the ball 22 can be undertaken in similar manner to the calibration in the y-z plane described above.

FIG. 5 illustrates the way in which the calibration ball must be attached to the first mounting in order to enable the above-described calibrations to be carried out.

It can be seen from FIGS. 3 and 4 that as the ball bar is rotated about the centre of the first ball and socket joint, it will at any given instant occupy a volume in space, and the sum of these volumes over the 360° rotation angle defines a disc-like slept volume in each of the three orthogonal planes.

Also the contact of the socket 36 with the surface of the ball 22, will sweep out an area on the surface of the ball in each of the three orthogonal planes.

The swept surface areas of the surface of ball 22 are shown shaded in FIG. 6, and it can be seen that eight small areas of the surface of the ball are not contacted by the socket during rotation of the ball bar in any of the three orthogonal planes. If the contact area between the ball 22 and the support rod 18 is made to lie wholly within one of these eight areas, contact between the ball bar and the support rod will be avoided.

It can be seen that with the preferred embodiment shown, all three axes of the machine can be calibrated about the centre of the ball 22, and can be calibrated without having to re-position the ball so that, no errors are introduced in correlating readings made in different axes from different positions. Also the set-up time for a complete three axis calibration is reduced.

Turning now to FIG. 7, there is shown a more detailed example of a mounting block for a ball bar according to the invention. In this example the mounting block 50 is rectangular and includes top, middle and bottom sections.

The bottom section 52 is formed from a standard magnetic base which holds the block in place on the machine bed. The middle section 54 is an adaptor for connecting the top section to the bottom section and is connected by suitable clamping means to both sections. The adaptor can have various thicknesses in order to vary the height of ball 22 above the machine table to accommodate ball bars of different lengths.

The top section 56 contains a battery to power the electronics of the ball bar and the cables which take power to the ball bar and return the signals from the ball bar feed into this top section through an aperture 60.

Some signal processing electronics can be housed in the top section to process the ball bar information before it passes to the machine over an RS232 link.

One corner of the top section 56 is chamfered at 45° to the adjacent top and side faces to provide a flat surface 62, and a rod 64 for supporting the calibration ball 22 is fixed onto this flat surface.

As described with reference to the mounting block of FIG. 1 the ball 22 is arranged to be supported outside of the projected area of the mounting block to enable a ball bar centred on the ball 22 move around the desired circles without contacting the block 50. Also the mounting for the ball bar on the quill of the machine may take the same form as shown in FIG. 2 and is not therefore described again.

The support for the calibration ball 22 on the mounting block in this embodiment is a retaining device as described in our U.S. Pat. No. 5,214,857. The device comprises a clamping device having a pair of jaws 70,72 which enclose a cylindrical bore 74. The jaws may be opened and closed by screw threaded engagement of a clamping bolt 76. As described in U.S. Pat. No. 5,214,857 the rod 28 terminates in a ball contained within the bore 74. When the jaws are unclamped the ball is free to pivot to assist an initial engagement and centring of the ball 22 with the socket 36 on the ball bar.

It is to be understood that the various modifications shown in the different embodiments may be used interchangeably with the other embodiments.

A further modification which may be made to any of the embodiments shown above is illustrated in FIG. 8. In this embodiment the second mounting is offset from the centre-line of the spindle 24 and cranked. By this means the axis of the ball can remain aligned with the spindle axis during rotation of the ball bar in the x-z and y-z planes, while allowing the mounting to be used with a conventional shank mounted on the spindle centre line.

This modification prevents any torque being applied to the spindle during rotation of the ball bar in these planes.

I claim:

1. Apparatus for use in calibrating relative movements of parts of a machine comprising a mounting device for supporting a telescoping calibration device for rotational movement about the centre of a ball during said relative movements of said machine parts, said device including support means for supporting the ball on one of the machine parts and wherein the centre of the ball defines the intersection of three orthogonal planes and the mounting device lies wholly within a volume not intersected by the planes.

2. Apparatus according to claim 1 and wherein the ball about which the calibration device rotates is permanently attached to the support means.

3. Apparatus according to claim 1 and wherein the ball about which the calibration device rotates is releasably attached to the support means.

4. Apparatus according to claim 1 and wherein the ball about which the calibration device rotates forms part of the calibration device itself.

5. Apparatus according to claim 1 and wherein the support means comprises a rod extending from the mounting device and an angle of substantially 45° to all three planes.

6. Apparatus according to claim 5 wherein the rod terminates in a socket for supporting the ball about which the calibration device rotates.

7. Apparatus according to claim 5 wherein the ball about which the calibration device rotates is permanently attached to the rod.

8. Apparatus for use in calibrating a machine having a table, a spindle, and means for producing relative circular movements therebetween in three orthogonal planes, the apparatus comprising:

a first mounting device on the machine table, a second mounting device on the machine spindle, a telescopic ball bar extending between the two mounting devices, a first ball and socket joint consisting of a ball on one of the ball bar and the first mounting which engages a socket on the other one of the ball bar and the first mounting, a second ball and socket joint consisting of a ball on one of the ball bar and the second mounting which engages a socket on the other one of the ball bar and the second mounting, characterised in that during said relative movement between the table and the spindle in each of said three orthogonal planes, the ball bar lies in a calibration plane which is parallel to the plane in which the movement is taking place and which includes the centre of the first ball and socket joint, and sweeps through a volume in space, the first mounting device is positioned such that it lies wholly outside said volumes swept by the ball bar in all three orthogonal planes, and the dimensions of the first and second mounting devices are such that the ball bar can be rotated through 360° in all three calibration planes without interference between any of the ball bar, the first and second mounting devices, the spindle and the machine table.

9. Apparatus according to claim 8 and wherein the dimensions of the mounting devices are such that the distances between the centre of the first ball and socket joint and the table, and between the second ball and socket joint and the spindle, are each greater than the distance between the centres of the two ball and socket joints by at least the radius of the first ball and socket joint.

10. Apparatus according to claim 8 and wherein the dimensions of each of the mounting devices are such that the distance of the centre of the first ball and socket joint from the table is greater than the distance between the centres of the two ball and socket joints by at least the radius of the second ball and socket joint, and the swept volumes of the ball bar in the three calibration planes do not include any part of the two mounting devices or of the spindle.

* * * * *